United States Patent
Lee et al.

(10) Patent No.: US 11,294,779 B2
(45) Date of Patent: Apr. 5, 2022

(54) MEMORY DEVICE PROVIDING FAST DATA RECOVERY

(71) Applicant: Apacer Technology Inc., New Taipei (TW)

(72) Inventors: Yu-Che Lee, New Taipei (TW); Jiunn-Chang Lee, New Taipei (TW)

(73) Assignee: Apacer Technology Inc., New Taipei (TW)

( * ) Notice: Subject to any disclaimer, the term of this patent is extended or adjusted under 35 U.S.C. 154(b) by 29 days.

(21) Appl. No.: 17/096,978

(22) Filed: Nov. 13, 2020

(65) Prior Publication Data
US 2022/0043724 A1 Feb. 10, 2022

(30) Foreign Application Priority Data
Aug. 5, 2020 (TW) .................................. 109126526

(51) Int. Cl.
*G06F 12/00* (2006.01)
*G06F 11/14* (2006.01)
(Continued)

(52) U.S. Cl.
CPC ...... *G06F 11/1469* (2013.01); *G06F 11/1451* (2013.01); *G06F 12/0246* (2013.01); (Continued)

(58) Field of Classification Search
CPC .............. G06F 11/1469; G06F 11/1451; G06F 12/0246; G06F 12/0292; G06F 12/0848; (Continued)

(56) References Cited

U.S. PATENT DOCUMENTS 8,099,572 B1 * 1/2012 Arora .................. G06F 13/28
711/E12.013
10,521,120 B1 12/2019 Miller
(Continued)

FOREIGN PATENT DOCUMENTS

TW 201013400 4/2010
TW 201245962 A1 11/2012
(Continued)

*Primary Examiner* — John A Lane
(74) *Attorney, Agent, or Firm* — Winston Hsu (57) ABSTRACT

A memory device includes a non-volatile memory chip, a connector and a memory controller. The non-volatile memory chip includes an access partition and a hidden partition. The memory controller is used to set first logical blocks mapping to mapping physical blocks in the access partition. The memory controller is used to maintain a first mapping table recording the first logical blocks and the mapping physical blocks. During backup, the memory controller is used to duplicate data in the mapping physical blocks to the hidden partition according to the first mapping table to form backup physical blocks, and establish a second mapping table setting second logical blocks to map to the backup physical blocks. During recovery, the memory controller is used to map the second logical blocks to the backup physical blocks according to the second mapping table for the host system to recover an environment set at the backup operation.

12 Claims, 5 Drawing Sheets

(51) Int. Cl.
  *G06F 12/02* (2006.01)
  *G06F 13/16* (2006.01)
  *G06F 12/0846* (2016.01)
  *G06F 13/40* (2006.01)
  *G06F 12/0873* (2016.01)
  *G06F 12/10* (2016.01)

(52) U.S. Cl.
  CPC ...... *G06F 12/0292* (2013.01); *G06F 12/0848* (2013.01); *G06F 12/0873* (2013.01); *G06F 12/10* (2013.01); *G06F 13/1668* (2013.01); *G06F 13/4068* (2013.01)

(58) Field of Classification Search
  CPC .. G06F 12/0873; G06F 12/10; G06F 13/1668; G06F 13/4068
  See application file for complete search history.

(56) References Cited

U.S. PATENT DOCUMENTS

| | | | |
|---|---|---|---|
| 2006/0277357 A1* | 12/2006 | Regnier | G06F 12/1009 711/6 |
| 2017/0090783 A1* | 3/2017 | Fukutomi | G06F 12/0253 |
| 2021/0286639 A1* | 9/2021 | Kumar | G06F 11/1469 |
| 2022/0004467 A1* | 1/2022 | Surakanti | G06F 11/1464 |

FOREIGN PATENT DOCUMENTS

| | | |
|---|---|---|
| TW | I524183 B | 3/2016 |
| TW | I548990 B | 9/2016 |
| TW | 201828066 A | 8/2018 |

\* cited by examiner

MEMORY DEVICE PROVIDING FAST DATA RECOVERY

CROSS REFERENCE TO RELATED APPLICATION

This non-provisional application claims priority of Taiwan patent application No. 109126526, filed on 5 Aug. 2020, included herein by reference in its entirety.

BACKGROUND OF THE INVENTION

1. Field of the Invention

The invention relates to semiconductor devices, and in particular, to a memory device.

2. Description of the Prior Art

As technology advances, the growing memory sizes of memory devices lead to more complex methods for managing the memory devices. Users would like to restore the original data upon modifying the data in the memory devices by mistakes or misusing incompatible third-party software, preventing unstable memory devices or data loss. In the related art, data restoration software is often used with a specific file format of the operating system to perform data restoration. The speed of data restoration may be slow and the data may not be usable owing to incompatibility to the file format of a management system, resulting in an unfavored effect of data restoration.

SUMMARY OF THE INVENTION

According to an embodiment of the invention, a memory device includes a non-volatile memory chip, a connector and a memory controller. The non-volatile memory chip includes a plurality of physical blocks divided into an access partition and a hidden partition. The connector is electrically connected to a host system. The memory controller is electrically connected to the non-volatile memory chip and the connector, and is used to set a plurality of first logical blocks mapped onto a plurality of mapping physical blocks in the access partition. The memory controller is used to provide the plurality of first logical blocks to the host system, and maintain a first mapping table to record the plurality of first logical blocks and the plurality of mapping physical blocks. When performing a data backup operation, the memory controller is used to duplicate data in the plurality of mapping physical blocks to the hidden partition according to the first mapping table to form a plurality of backup physical blocks, and establish a second mapping table setting a plurality of second logical blocks to map the plurality of backup physical blocks. When performing a data recovery operation, the memory controller is used to map the plurality of second logical blocks to the plurality of backup physical blocks according to the second mapping table, and the host system is configured to recover an environment set at the data backup operation according to the second mapping table.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
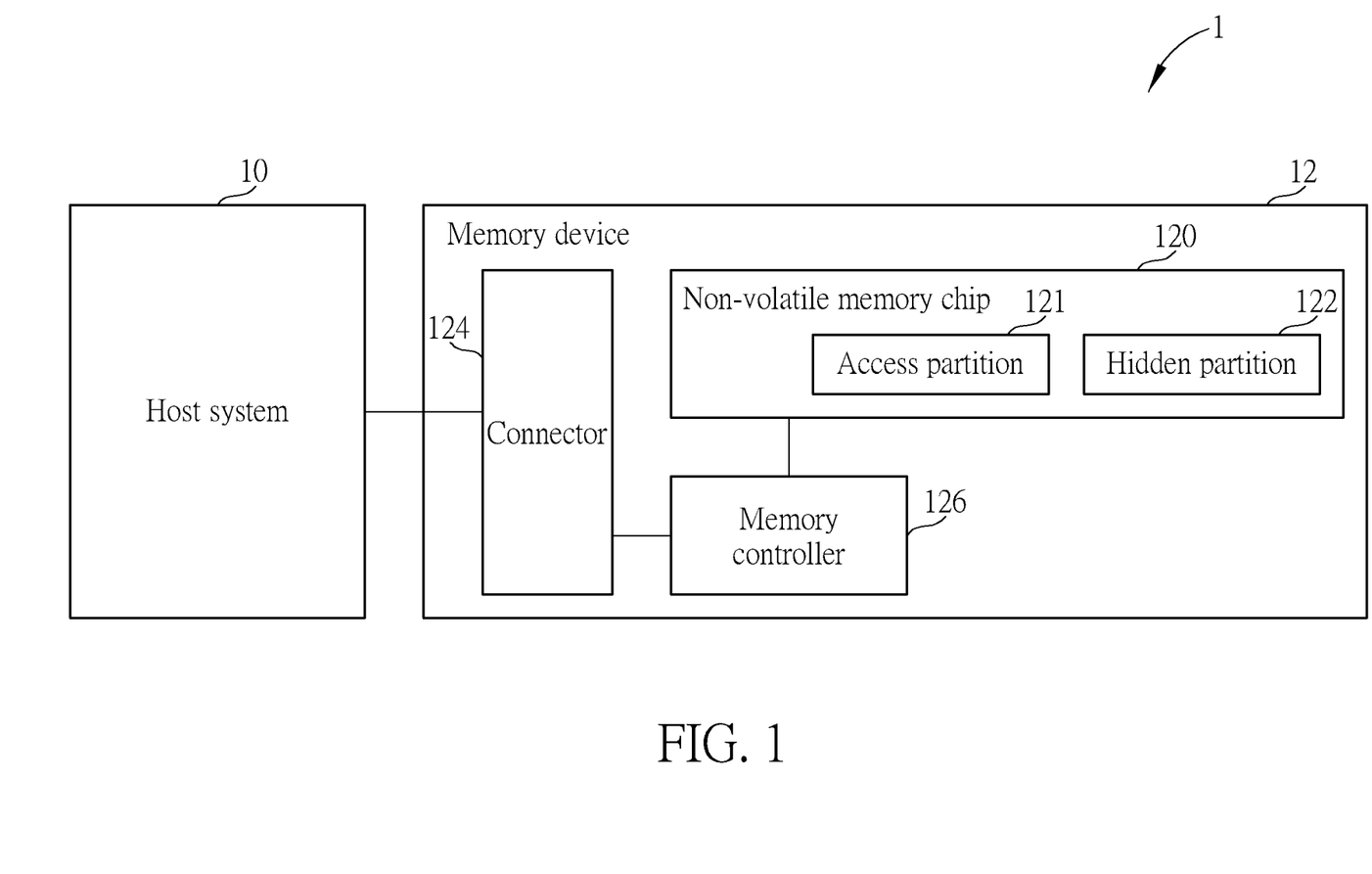
FIG. 1 is a block diagram of a memory system according to an embodiment of the invention.

FIG. 1 is a block diagram of a memory system 1 according to an embodiment of the invention. The memory system 1 includes a host system 10 and a memory device 12. The memory device 12 includes a non-volatile memory chip 120, a connector 124 and a memory controller 126. The memory device 12 may be triggered to automatically perform a data backup operation and a data recovery operation without employing a third-party software, achieving a fast and full data recovery of the memory device 12 without the user being aware of it.

The host system 10 may be a computer. The memory device 12 may be a solid state drive, a flash drive or a memory card. The non-volatile memory chip 120 may be a NAND flash memory. The host system 10 may access the memory device 12 to perform a power-on operation and other data access operations. The non-volatile memory chip 120 may include a plurality of physical blocks, the plurality of physical blocks being divided into an access partition 121 and a hidden partition 122. In some embodiments, the plurality of physical blocks may be divided into an access partition 121, a hidden partition 122, an over-provisioning (OP) partition and other partitions. The connector 124 may be electrically connected to a host system 10. The memory controller 126 may be electrically connected to the non-volatile memory chip 120 and the connector 124. The host system 10 may read from one of the access partition 121 and the hidden partition 122 via the connector 124 and the memory controller 126 to perform the power-on operation and other data access operations, and employ the over-provisioning partition to perform background processes during normal operations. The background processes may include the data backup operation, a bad-block management operation and other data operations. In some embodiments, the access partition 121 and the hidden partition 122 may be equal in size. In other embodiments, the access partition 121 and the hidden partition 122 may be different in size. The memory size of the over-provisioning partition may be less than the memory size of the access partition 121 and the memory size of the hidden partition 122. For example, the memory size of the access partition 121 may be 100 MB, the memory size of the hidden partition 122 may be 100 MB, and the memory size of the over-provisioning partition may be 16 MB.

The memory controller 126 may load firmware to control the power-on operation, the data backup operation, the data recovery operation and other data access operations of the memory device 12. The memory device 12 may further include an internal memory to store the firmware. When performing a data programming operation or a data duplication operation, the memory controller 126 may employ a predetermined programming algorithm such as a wear-leveling algorithm to program data into the non-volatile memory chip 120, programing the data into all physical blocks in the non-volatile memory chip 120 in a uniform manner, preventing any particular physical block from premature damage owing to repeated programming and erasing, and protecting the non-volatile memory chip 120 from being unserviceable as a result of too many bad blocks.

Figure 2:
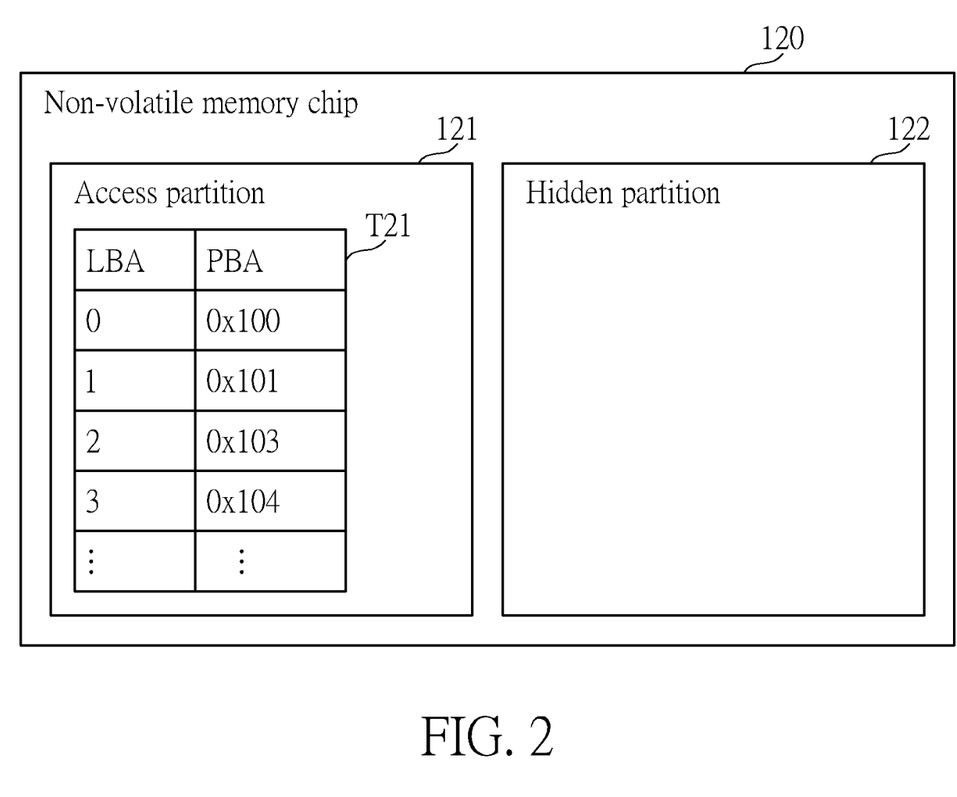
FIG. 2 is a schematic diagram of a program operation of the memory device in FIG. 1.

FIG. 2 is a schematic diagram of a program operation of the memory device 12, embodying a case where the host system 10 may only access the access partition 121 of the non-volatile memory chip 120. When the host system 10 performs programming to the memory system 12, the memory controller 126 may receive data from the host system 10 via the connector 124, and program the data into the plurality of physical blocks in the access partition 121 according to the predetermined programming algorithm. The data may be a system file required for the power-on operation, user data or other data. The memory controller 126 may set a plurality of first logical blocks to be mapped onto a plurality of mapping physical blocks in the access partition 121. The memory controller 126 may provide the plurality of mapping physical blocks to the host system 10, and maintain a first mapping table T21 that records the plurality of first logical blocks and the plurality of mapping physical blocks. The first mapping table T21 may be stored in the access partition 121 and may be a logical-block-address-to-physical-block-address (L2P) table mapping logical block addresses (LBA) of the plurality of first logical blocks to physical block addresses (PBA) of the plurality of mapping physical blocks in the access partition 121. For instance, the first mapping table T21 may map a logical block address "0" to a physical block address "0x100", map a logical block address "1" to a physical block address "0x101", map a logical block address "2" to a physical block address "0x103", and map a logical block address "3" to a physical block address "0x104". The hidden partition 122 may contain no data, and the host system 10 may be unable to access the hidden partition 122.

Figure 3:
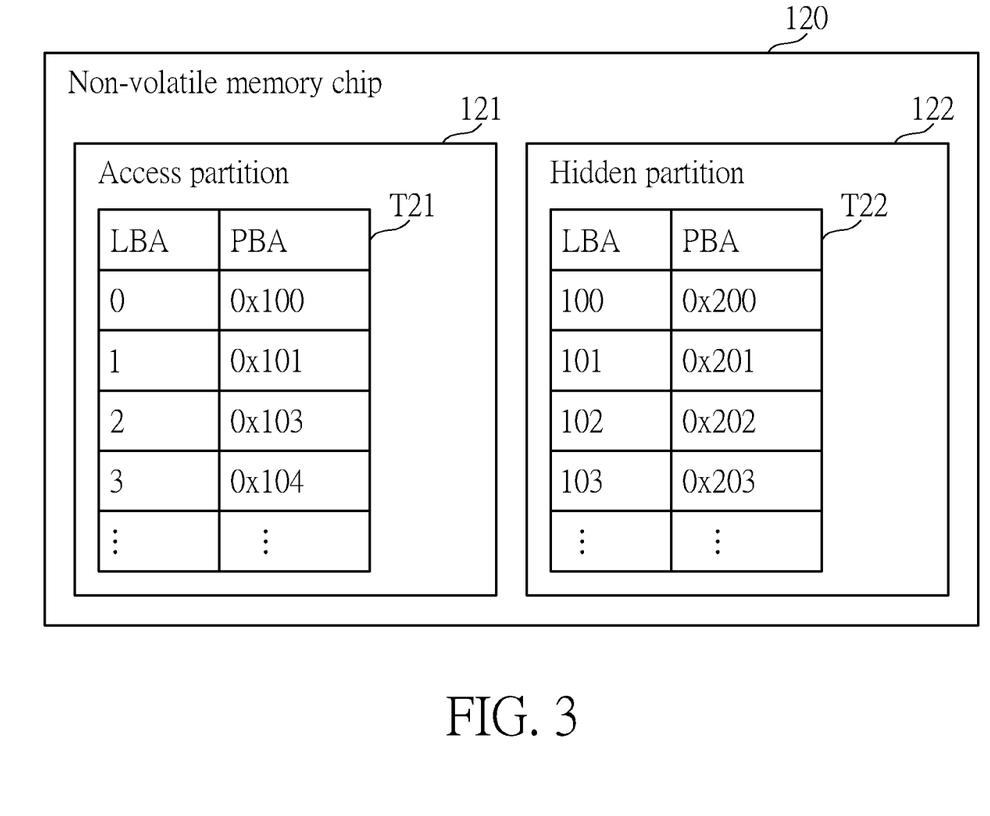
FIG. 3 is a schematic diagram of a data backup operation of the memory device in FIG. 1.

FIG. 3 is a schematic diagram of a data backup operation of the memory device 12. When performing the data backup operation, the memory controller 126 may employ the predetermined programming algorithm to duplicate the data in the plurality of mapping physical blocks to the hidden partition 122 according to the first mapping table T21 to form a plurality of backup physical blocks, establish a second mapping table T22, and set a plurality of second logical blocks to be mapped onto the plurality of backup physical blocks in the second mapping table T22. The second mapping table T22 may be stored in the hidden partition 122 and may be a logical-block-address-to-physical-block-address table mapping logical block addresses of the plurality of second logical blocks to physical block addresses of the plurality of backup physical blocks in the hidden partition 122. For instance, the second mapping table T22 may map a logical block address "100" to a physical block address "0x200", map a logical block address "101" to a physical block address "0x201", map a logical block address "102" to a physical block address "0x202", and map a logical block address "103" to a physical block address "0x203". Each of the first logical blocks may be translated to one of the plurality of second physical blocks by a fixed address difference. For example, the logical block addresses of the first logical blocks "0", "1", "2", "3" may be translated to the logical block addresses of the second logical blocks "100", "101", "102", "103" by a fixed address difference "100".

In some embodiments, the data backup operation may be triggered by a user. The user may enter a predefined backup command into the host system 10. Upon the memory controller 126 receiving the backup command via the host system 10 and the connector 124, the memory controller 126 may back up the data in the access partition 121 to the hidden partition 122 according to the data backup operation. In other embodiments, the data backup operation may be automatically triggered by the memory device 12 according to the number of times the memory device 12 powering on successfully. After the memory device 12 powers on, the memory controller 126 may record a boot sequence. The memory controller 126 may receive the boot sequence from the host system 10. The boot sequence may include a set of logical block addresses corresponding to a set of logical blocks of the plurality of first logical blocks. In one example, the boot sequence may include {0, 1, 0, 1, 2, 3}. The memory controller 126 may record the boot sequence in the memory device 12 such as in the non-volatile memory chip 120, the memory controller 126 or other memories in the memory device 12. The memory controller 126 may map the set of logical blocks of the plurality of first logical blocks to a set of physical blocks of the plurality of mapping physical blocks in the access partition 121 according to the first mapping table T21, so as to perform the boot sequence. For example, the memory controller 126 may map the boot sequence {0, 1, 0, 1, 2, 3} to a set of physical block addresses {0x100, 0x101, 0x100, 0x101, 0x103, 0x104} corresponding to a set of physical blocks according to the first mapping table T21, so as to perform the booting process according to the data at the set of physical block addresses {0x100, 0x101, 0x100, 0x101, 0x103, 0x104}. When succeeding in performing the booting process for a second number of times by mapping to the plurality of mapping physical blocks in the access partition 121 according to the plurality of first logical blocks, the memory controller 126 may determine that the data at the set of physical block addresses {0x100, 0x101, 0x100, 0x101, 0x103, 0x104} are accurate for performing the data backup operation. The second number of times may be once.

In some embodiments, if a power shutdown has occurred during the data backup operation, then after a power restoration, the memory controller 126 may again duplicate the data in the plurality of mapping physical blocks in the access partition 121 to the plurality of backup physical blocks in the hidden partition 122 according to the first mapping table T21, and update the second mapping table T21 accordingly. In some embodiments, rather than starting all over to duplicate all data in the mapping physical blocks in the first mapping table T21, the data backup operation after the power restoration may resume the data backup from an interrupted address in the first mapping table T21 used when the power shutdown occurs, thereby preventing the backup efficiency of the memory device 1 from being affected by the power shutdown. The interrupted address may be a logical address or a physical address in the first mapping table T21. In some embodiments, the memory controller 126 may perform the data backup operation in the background process.

Figure 4:
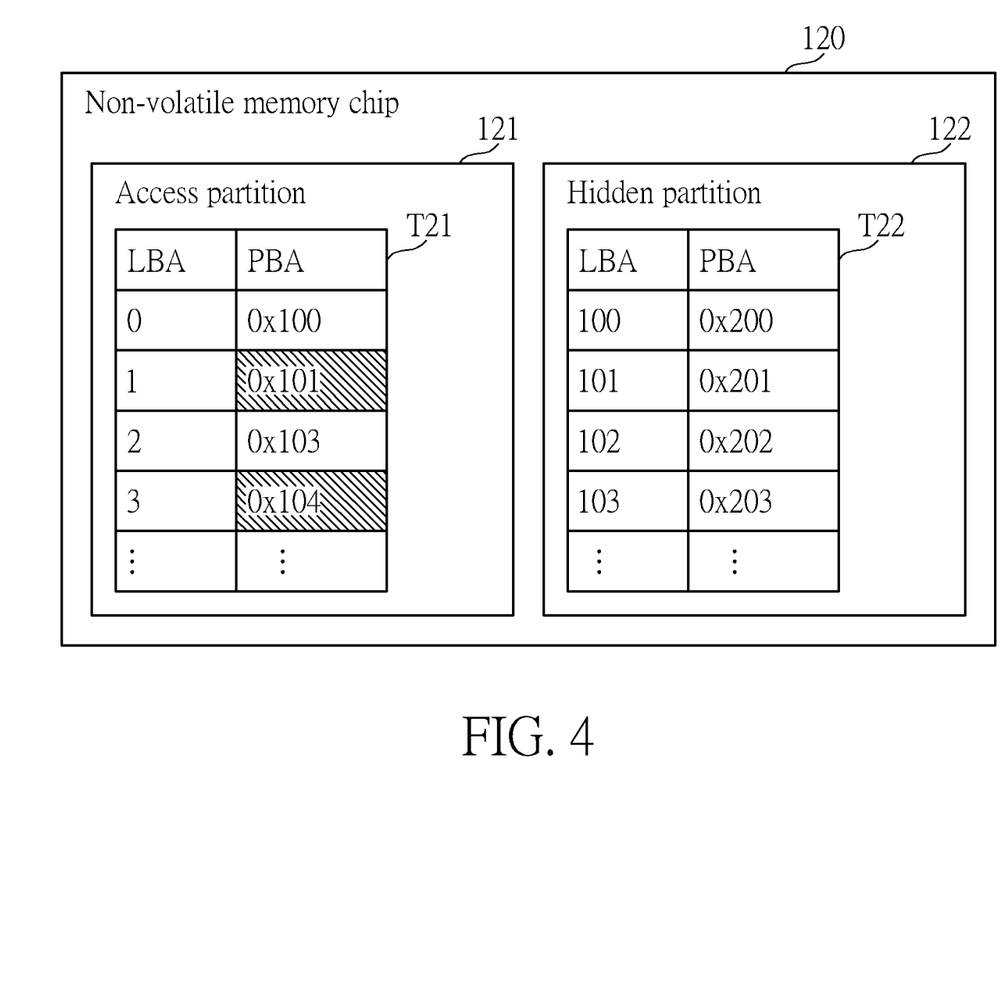
FIG. 4 is a schematic diagram of a data recovery operation of the memory device in FIG. 1.

FIG. 4 is a schematic diagram of a data recovery operation of the memory device 12. The shadowed portion of physical block addresses in the first mapping table T21 indicates that the data stored thereat are fully or partially overwritten or fully or partially damaged. When the host system 10 performs the programming operation to the access partition 121 of the memory device 12, the data in the access partition 121 may be fully or partially overwritten or fully or partially damaged. If the overwritten or damaged data is important, e.g., the system file required for the booting process, then the data recovery operation should be performed on the memory device 12. In the data recovery operation, the memory controller 126 may map the plurality of second logical blocks to the plurality of backup physical blocks according to the second mapping table T22 for the host system 10 to recover an environment set at the data backup operation according to the second mapping table T22. For instance, the data at the physical block addresses "0x101" and "0x104" in the first mapping table T21 has been overwritten or damaged. Since the data at the physical block addresses "0x101" and "0x104" is system files required for the booting process, the memory controller 126 will perform the data recovery operation. In some embodiments, when performing the data recovery operation, the memory controller 126 may translate a set of addresses of a set of logical blocks of the plurality of first logical blocks to a set of addresses of a set of logical blocks of the plurality of second logical blocks, and then map the set of addresses of the set of logical blocks of the plurality of second logical blocks to a set of addresses of a set of physical blocks of the plurality of backup physical blocks to perform the booting process. For example, the memory controller 126 may translate the boot sequence {0, 1, 0, 1, 2, 3} to a set of logical addresses {100, 101, 100, 101, 102, 103} of a set of logical blocks of the plurality of second logical blocks, and map the set of logical addresses {100, 101, 100, 101, 102, 103} of the set of logical blocks of the plurality of second logical blocks to a corresponding set of physical block addresses {0x200, 0x201, 0x200, 0x201, 0x202, 0x203} of a set of physical blocks of the plurality of backup physical blocks according to the second mapping table T22, so as to perform the booting process according to the data at the corresponding set of physical block addresses {0x200, 0x201, 0x200, 0x201, 0x202, 0x203}.

In some embodiments, the data recovery operation may be triggered by a user. The user may enter a predefined recovery command into the host system 10. Upon the memory controller 126 receiving the recovery command via the host system 10 and the connector 124, the memory controller 126 may read the data backed up previously and perform corresponding operations according to the data backup operation. In other embodiments, the data recovery operation may be automatically triggered by the memory device 12 according to the number of times that the memory device 12 fails to boot. The memory controller 126 may receive the boot sequence from the host system 10 to access the set of logical blocks of the plurality of first logical blocks. The memory controller 126 may map the set of logical block addresses of the plurality of first logical blocks to the set of physical blocks of the plurality of mapping physical blocks in the access partition 121 according to the first mapping table T21, so as to perform the boot sequence. After the memory controller 126 attempts and fails performing the boot sequence for the first number of times, the memory controller 126 may perform the data recovery operation. For example, the first number of times may be three times. In the example, since the data at the physical block addresses "0x101" and "0x104" is overwritten or damaged, the memory controller 126 may not successfully perform the boot sequence according to the corresponding set of physical block addresses {0x100, 0x101, 0x100, 0x101, 0x103, 0x104}. After performing the booting process using the corresponding set of physical block addresses {0x100, 0x101, 0x100, 0x101, 0x103, 0x104} for 3 attempts and yet failed, the memory controller 126 may perform the data recovery operation by booting up using the data in the corresponding set of physical block addresses {0x200, 0x201, 0x200, 0x201, 0x202, 0x203}.

Upon successfully performing the booting process using the data recovery operation, the memory device 12 may continue to employ the data recovery operation for the booting process until the booting process is failed again. In some embodiments, if the memory device 12 fails to successfully perform the boot sequence after attempting and failing performing the data recovery operation for the first number of times, the memory controller 126 may switch to the first mapping table T21 to perform the booting process. The memory device 12 may configure a data recovery flag to indicate whether the memory device 12 is using the data recovery operation for the booting process. When the data recovery operation is in use, the memory controller 126 may set the data recovery flag to a first logical level, e.g., a logical level "H", translate the set of logical blocks of the first logical blocks to the set of logical blocks of the second logical blocks, and then perform the booting process according to the second mapping table T22; when the data recovery operation is not in use, the memory controller 126 may set the data recovery flag to a second logical level, e.g., a logical level "L", and then perform the booting process according to the first mapping table T21.

Figure 5:
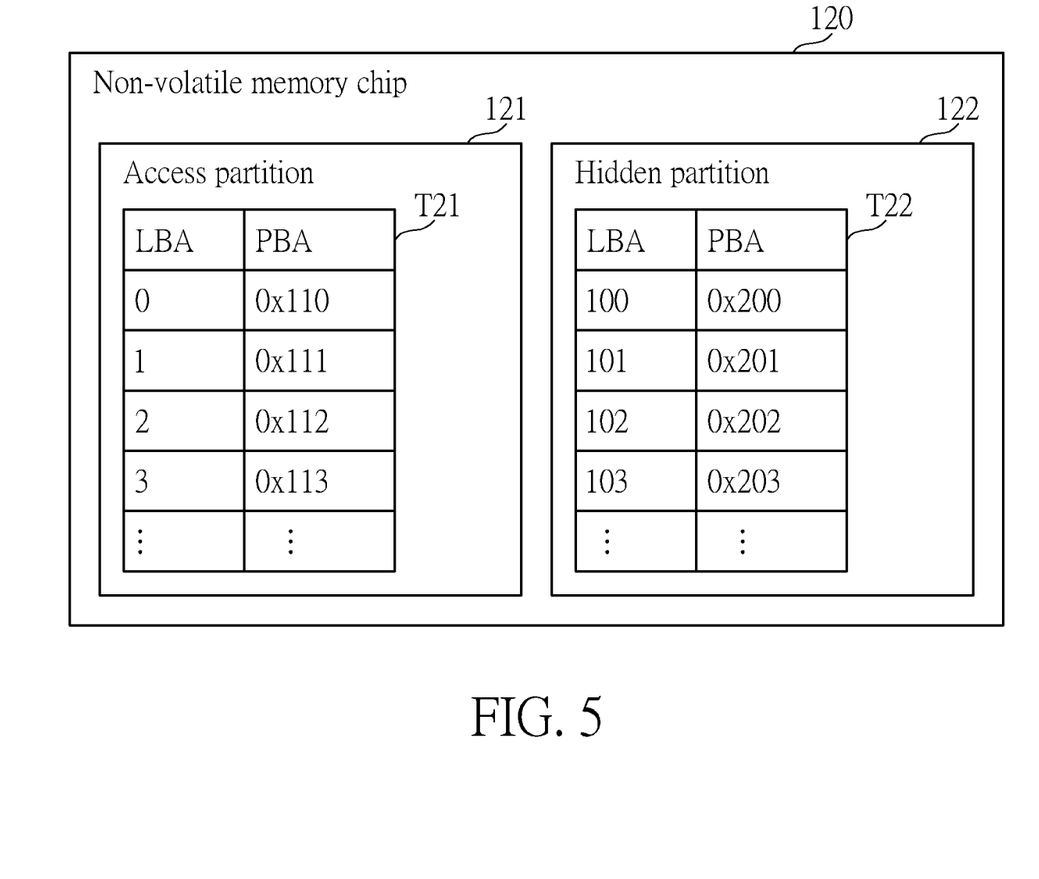
FIG. 5 is a schematic diagram of another data backup operation of the memory device in FIG. 1.

FIG. 5 is a schematic diagram of another data backup operation of the memory device 12. When the memory controller 126 maps the plurality of second logical blocks to the plurality of backup physical blocks and succeeds in performing the booting process using the data recovery operation for a third number of times, the memory controller 126 may perform the data backup operation by duplicating data in the plurality of backup physical blocks to the access partition 121 according to the second mapping table T22, and update the first mapping table T21 accordingly. For example, when performing the data backup operation, the memory controller 126 may duplicate the data at the physical block addresses "0x200", "0x201", "0x202", "0x203" in the hidden partition 122 to the physical block addresses "0x110", "0x111", "0x112", "0x113" in the access partition 121, and update the first mapping table T21 accordingly. The third number of times may be identical to or different from the second number of times. For example, the third number of times may be once. In some embodiments, the data recovery operation may also be triggered by a user. The user may enter the predefined backup command into the host system 10. Upon the memory controller 126 receiving the backup command via the host system 10 and the connector 124, the memory controller 126 may back up the data in the hidden partition 122 to the access partition 121 according to the data backup operation.

In some embodiments, if a power shutdown has occurred during the data backup operation, after a power restoration, the memory controller 126 may again duplicate the data in the plurality of backup physical blocks in the hidden partition 122 to the plurality of mapping physical blocks in the access partition 121 according to the second mapping table T22, and update the first mapping table T21 accordingly. In some embodiments, the memory controller 126 may perform the data backup operation in the background process. Rather than starting all over to duplicate all the data in the backup physical blocks according to the second mapping table T22, the data backup operation after the power restoration may resume the data backup from an interrupted address in the second mapping table T22 used when the power shutdown occurs, thereby preventing the backup efficiency of the memory device 1 from being affected by the power shutdown. The interrupted address may be a logical address or a physical address in the second mapping table T22.

While the embodiments in FIGS. 1 to 5 divide the non-volatile memory chip 120 into the access partition 121 and the hidden partition 122, the non-volatile memory chip 120 may also be divided into an access partition and a plurality of hidden partitions in other embodiments. When performing the data backup operation, the memory controller 126 may duplicate the data in a partition that has been used to successfully perform the booting process to the other unused partitions based on the principle of the data backup operation. When performing the data recovery operation, the memory controller 126 may perform the data recovery operation according to a fixed order or a random order to switch to one of the other unused partitions.

In this manner, the memory device 12 may be triggered to automatically perform the data backup operation and the data recovery operation without employing the third-party software, achieving a fast and full data recovery of the memory device 12 without the user being aware of it.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory device comprising:
   a non-volatile memory chip comprising a plurality of physical blocks, the plurality of physical blocks being divided into at least an access partition and a hidden partition;
   a connector electrically connected to a host system; and
   a memory controller electrically connected to the non-volatile memory chip and the connector, the memory controller being configured to set a plurality of first logical blocks mapping to a plurality of mapping physical blocks in the access partition;
   wherein the memory controller is configured to provide the plurality of first logical blocks to the host system, and maintain a first mapping table to record the plurality of first logical blocks and the plurality of mapping physical blocks;
   when performing a data backup operation, the memory controller is configured to duplicate data in the plurality of mapping physical blocks to the hidden partition according to the first mapping table to form a plurality of backup physical blocks, and establish a second mapping table setting a plurality of second logical blocks to map the plurality of backup physical blocks; and
   when performing a data recovery operation, the memory controller is configured to map the plurality of second logical blocks to the plurality of backup physical blocks according to the second mapping table, and the host system is configured to recover an environment set at the data backup operation according to the second mapping table.

2. The memory device of claim 1, wherein:
   when accessing a set of logical blocks of the plurality of first logical blocks, the memory controller is further configured to map the set of logical blocks of the plurality of first logical blocks to a set of physical blocks of the plurality of mapping physical blocks in the access partition according to the first mapping table to perform a booting process, and perform the data recovery operation if the booting process fails after the set of logical blocks is mapped to the set of physical blocks of the plurality of mapping physical blocks in the access partition for a first number of times.

3. The memory device of claim 2, wherein a boot sequence of the booting process is recorded in the memory device.

4. The memory device of claim 2, wherein:
   when performing the data recovery operation, the memory controller is configured to translate a set of addresses of the plurality of first logical blocks to a set of addresses of the plurality of second logical blocks, and then map the set of addresses of the plurality of second logical blocks to a set of addresses of the plurality of backup physical blocks to perform the booting process.

5. The memory device of claim 4, wherein a boot sequence of the booting process is recorded in the memory device.

6. The memory device of claim 1, wherein:
   when succeeding in performing the booting process for a second number of times by mapping to the plurality of mapping physical blocks in the access partition according to the plurality of first logical blocks, the memory controller is configured to perform the data backup operation.

7. The memory device of claim 6, wherein if a power shutdown has occurred during the data backup operation, after a power restoration, the memory controller is configured to duplicate data in the plurality of mapping physical blocks in the access partition to the plurality of backup physical blocks in the hidden partition according to the first mapping table, and update the second mapping table accordingly.

8. The memory device of claim 7, wherein if the power shutdown has occurred during the data backup operation, after the power restoration, the memory controller is configured to resume to duplicate the data in the plurality of mapping physical blocks in the access partition located after an address in the first mapping table to the plurality of backup physical blocks in the hidden partition, and update the second mapping table accordingly, the address being used when the power shutdown occurs.

9. The memory device of claim 1, wherein:
   when succeeding in performing the booting process for a third number of times by mapping to the plurality of backup physical blocks according to the plurality of second logical blocks, the memory controller is configured to duplicate data in the plurality of backup physical blocks to the access partition according to the second mapping table, and update the first mapping table accordingly.

10. The memory device of claim 9, wherein if a power shutdown has occurred when the memory controller is configured to duplicate the data in the plurality of backup physical blocks to the access partition according to the second mapping table and update the first mapping table accordingly, after a power restoration, the memory controller is configured to duplicate the data in the plurality of backup physical blocks to the access partition according to the second mapping table, and update the first mapping table accordingly.

11. The memory device of claim 10, wherein if the power shutdown has occurred when the memory controller is configured to duplicate the data in the plurality of backup physical blocks to the access partition according to the second mapping table and update the first mapping table accordingly, after the power restoration, the memory controller is configured to resume to duplicate the data in the plurality of backup physical blocks located after an address in the second mapping table to the access partition, and update the first mapping table accordingly, the address being used when the power shutdown occurs.

12. The memory device of claim 1, wherein the access partition and the hidden partition are equal in size.

* * * * *